United States Patent
Cha et al.

(10) Patent No.: US 9,563,098 B2
(45) Date of Patent: Feb. 7, 2017

(54) METHOD OF AND DEVICE FOR CONTROLLING REFLECTIVE COLOR OF POLYMERIC COLLOIDAL PHOTONIC CRYSTAL DISPLAY USING MIXED DISPERSION MEDIUM

(71) Applicants: Samsung Electronics Co., Ltd., Gyeonggi-do (KR); Industry-Academia Cooperation Group of Sejong University, Seoul (KR)

(72) Inventors: Kyunghoon Cha, Seoul (KR); Wonmok Lee, Seoul (KR); Jongin Lee, Gyeonggi-do (KR); Sungkoo Han, Seoul (KR); Kyeonghyeon Ko, Gyeonggi-do (KR)

(73) Assignees: Samsung Electronics Co., Ltd (KR); Industry-Academia Cooperation Group of Sejong University (KR)

( * ) Notice: Subject to any disclaimer, the term of this patent is extended or adjusted under 35 U.S.C. 154(b) by 18 days.

(21) Appl. No.: 14/334,050

(22) Filed: Jul. 17, 2014

(65) Prior Publication Data

US 2015/0022877 A1    Jan. 22, 2015

(30) Foreign Application Priority Data

Jul. 17, 2013  (KR) .......................... 10-2013-0083998

(51) Int. Cl.
*G02B 26/00* (2006.01)
*G02F 1/167* (2006.01)
*G02F 1/21* (2006.01)

(52) U.S. Cl.
CPC ............... *G02F 1/167* (2013.01); *G02F 1/21* (2013.01); *G02F 2001/1678* (2013.01); *G02F 2202/32* (2013.01); *G02F 2203/34* (2013.01)

(58) Field of Classification Search
CPC ........................................................ G02F 1/167
USPC ........................................................ 359/296
See application file for complete search history.

(56) References Cited

U.S. PATENT DOCUMENTS

| | | | | |
|---|---|---|---|---|
| 2012/0080878 A1* | 4/2012 | Kecht | ...................... | B41M 3/14 283/85 |
| 2012/0188295 A1* | 7/2012 | Joo | ......................... | G02F 1/167 345/690 |
| 2014/0124369 A1* | 5/2014 | Han | ...................... | C25D 15/00 204/478 |

* cited by examiner

*Primary Examiner* — James Jones
(74) *Attorney, Agent, or Firm* — The Farrell Law Firm, P.C.

(57) ABSTRACT

A method of and device for controlling a reflective color of a photonic crystal display device, capable of precisely controlling the distance between particles to display RGB full colors covering desired wavelength ranges. The method and device include using a mixed dispersion medium containing two or more kinds of solvents having different dielectric constants as a dispersion medium for a photonic crystal in a composition for a photonic crystal display device of which colors are controlled through the application of an electric field.

8 Claims, 8 Drawing Sheets

METHOD OF AND DEVICE FOR CONTROLLING REFLECTIVE COLOR OF POLYMERIC COLLOIDAL PHOTONIC CRYSTAL DISPLAY USING MIXED DISPERSION MEDIUM

PRIORITY

This application claims priority under 35 U.S.C. §119(a) to a Korean Patent Application filed on Jul. 17, 2013 and assigned Serial No. 10-2013-0083998, the entire content of which is incorporated herein by reference.

BACKGROUND

1. Field of the Invention

The present invention generally relates to a method of controlling a reflective color of a photonic crystal display device.

2. Description of the Related Art

Reflective display devices that can be driven at low power and can be applied as flexible devices have been intensively researched and developed. An example of such a reflective display device may be an electronic ink, which basically employs a black and white display method and thus requires color filters in order to realize a full-color display device. However, the installation of the color filters causes a decrease in reflectance, resulting in dark colors, difficulty in displaying various colors, a slow color conversion rate, and, therefore, limited capability in displaying moving images.

One of the methods proposed to solve the problems of reflective color display devices of the prior art, is a display method using photonic crystal characteristics of particles dispersed in a medium. A photonic crystal refers to particles or a three-dimensional structure arranged in a medium. The light incident to the photonic crystal is Bragg-diffracted by the three-dimensional structure to reflect only the light of a specific wavelength. The photonic crystal may be used for an electrochromic display device by using a structural feature in which the distance between particles is changed through an electric field. Since the photonic crystal display device requires no color filters for displaying Red, Green, Blue (RGB) full colors and is thin, it can obtain a very high reflectance depending on the manufacturing technique. Therefore, the photonic crystal display device is drawing attention as a core technology for the next-generation display device.

The prior art proposed a technology in which specific-sized particles having surface charges are dispersed in a single solvent to prepare a liquid colloidal photonic crystal, to which an electric field is then applied to control a reflective color. However, in order to display desired ranges of colors in the display device, the size of the photonic crystal particles contained in the colloid should be precisely adjusted during a synthetic procedure of the photonic crystal. Moreover, water used as a single colloidal solvent causes hydrogen to be generated by electrolysis, and causes long-term instability due to its volatility.

SUMMARY

The present invention has been made to address the above problems and disadvantages, and to provide at least the advantages described below. Accordingly, an aspect of the present invention provides a method of and device for controlling a reflective color of a polymeric colloidal photonic crystal display device, free from a side reaction and having low volatility and thus improving stability, controlling the distance between photonic crystal particles through the adjustment of the concentration of the mixed dispersion medium, and displaying clear colors even when the concentration of the photonic crystal particles is low, by dispersing photonic crystal particles in a mixed dispersion medium containing two or more kinds of solvents.

In accordance with an aspect of the present invention, a method for controlling a reflective color of a photonic crystal is provided. The method includes dispersing photonic crystal particles having surface charges in a mixed dispersion medium containing at least two solvents having different dielectric constants, and selecting user-definable concentrations of the at least two solvents in the mixed dispersion medium.

In accordance with another aspect of the present invention, a photonic crystal is provided. The photonic crystal includes photonic crystal particles having surface charges dispersed in a mixed dispersion medium containing at least two solvents having different dielectric constants, wherein each of the at least two solvents is a user-definable concentration of the mixed dispersion medium.

In accordance with another aspect of the present invention, a photonic crystal display is provided. The photonic crystal display includes photonic crystal particles having surface charges dispersed in a mixed dispersion medium containing at least two solvents having different dielectric constants, wherein each of the at least two solvents is a user-definable concentration of the mixed dispersion medium, and wherein the photonic crystal is sealed in a container having two or more light transmissive electrodes.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF THE EXEMPLARY EMBODIMENTS OF THE PRESENT INVENTION

Figure 1:
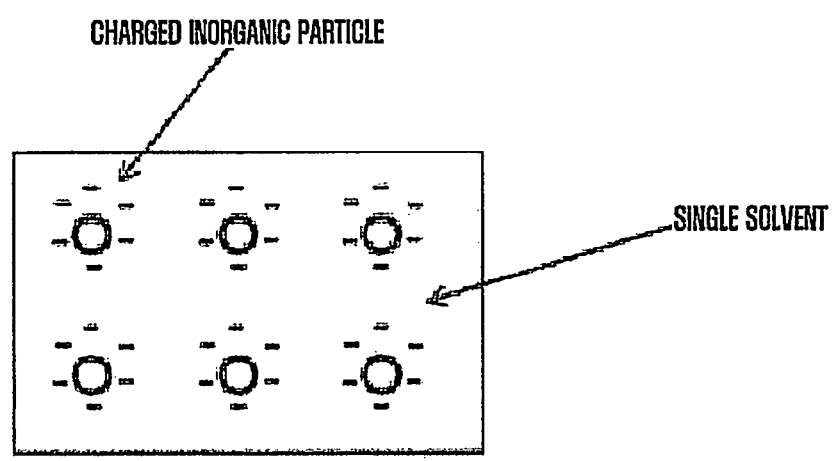
FIG. 1 illustrates a polymeric colloidal photonic crystal display device using inorganic particles and a single dispersion medium according to the prior art.

In an embodiment of the present invention, selecting user-definable concentrations of the at least two solvents in the mixed dispersion medium is adjusting the concentrations to control the reflective color of the photonic crystal.

In an embodiment of the present invention, the photonic crystal particles are polymer particles having surface charges. The photonic crystal particles have surface charges of the same polarity in the photonic crystal, and thus can be arranged at predetermined intervals.

The photonic crystal particles may be polystyrene particles, polymethylmethacrylate particles, or the like, and preferably polystyrene spherical particles. The polystyrene spherical particles may be prepared to have a state in which the surface anion density of the synthesized particle is high, by using an anionic monomer and an anionic initiator at the time of synthesis.

The photonic crystal particles may have a diameter of 50 nm to 300 nm, but are not limited thereto. Since the surface potential of the photonic crystal particle varies depending on the particle size, the peak of a reflective color spectrum shown when the same voltage is applied to the particles varies. Therefore, in order to adjust the color displayed at a desired voltage, the peak of the photonic crystal on the reflective color spectrum can be easily controlled by controlling the concentration of the complex dispersion medium, unlike the prior art in which the size of the particles needs to be precisely controlled at the time of synthesis of the particles themselves.

The photonic crystal particles may be contained in a content of 0.1-70 wt % and more specifically 3-15 wt % based on the total weight of the photonic crystal. If the content of the photonic crystal particles is less than 0.1 wt %, the sufficient diffraction to display colors does not occur. If the content of the photonic crystal particles is more than 70 wt %, the colloidal particles slow down due to high viscosity, falling to easily display colors. In addition, as will be described later, in the photonic crystal according to the present invention, the distance between particles can be precisely controlled by adjusting the concentration of the mixed dispersion medium. Therefore, the inclusion of only photonic crystal particles having a low concentration such as 15 wt % or less can display clear colors and display RGB full colors.

In an embodiment of the present invention, the mixed dispersion medium may contain two or more kinds of solvents having different dielectric constants, and the solvents may be a polarizable liquid. Examples of the polarizable liquid may include water, methanol, ethanol, 1-propanol, 2-propanol, 1-butanol, ethylene glycol, glycerol, diethyl ether, methyl-t-butyl ether, ethyl acetate, butyl acetate, 2-butanol, acetonitrile, acetic acid, propylene carbonate, and the like. Preferably, the mixed dispersion medium may include water and ethylene glycol or glycerol. The wavelength of the peak of the reflective color spectrum, which is shown when a single solvent is used as a dispersion medium, can be shifted by adjusting the concentration of the mixed dispersion medium, so that the wavelength of the reflective color of the photonic crystal can be precisely controlled.

The difference in the dielectric constant between the solvents contained in the mixed dispersion medium is preferably 0.1-10, and the difference in the refractive index between the photonic crystal particle and the mixed dispersion medium may be at least 0.05.

In an embodiment of the present invention, in the photonic crystal display device, an electric field of 0.1-20 V is applied between the light transmissive electrodes to control the distance between particles, thereby controlling the wavelength of the reflective color. The light transmissive electrode may be divided into two or more regions to which the electric field is to be applied, and the electric field may be applied to each of the regions.

The light transmissive electrode may be a transparent electrode that is typically used in the art associated with the photonic crystal display device, and for example, may be an indium tin oxide (ITO) electrode, but is not limited thereto.

According to the method for controlling a reflective color of a photonic crystal display device of the present invention, the photonic crystal is prepared by dispersing photonic crystal particles in a mixed dispersion medium containing two or more kinds of solvents. Further, the distance between photonic crystal particles is precisely controlled by adjusting the solvent concentration in the mixed dispersion medium, so that the desired reflective color peak can be precisely controlled regardless of the particle size determined by the synthesis of the photonic crystal particles and the concentration of photonic crystal particles. Further, the photonic crystal prepared according to an embodiment of the present invention contains a low-volatile solvent in addition to water, thereby avoiding the deterioration in long-term stability due to volatilization of the solvent and preventing the side reaction in which hydrogen is generated in the presence of excessive water by electrolysis of water through voltage application. Therefore, as for the method for controlling a reflective color of a photonic crystal display device according to the present invention, desired RGB full colors can be easily displayed without precisely adjusting the particle size at the time of synthesis of photonic crystal particles in order to control the reflective color wavelength, and the wavelength range of the displayable colors is widened, so that there can be manufactured a display device capable of displaying clear colors even when the concentration of photonic crystal particles is low, being free from a side reaction, and having excellent long-term stability.

Hereinafter, although the present invention will be described in detail with reference to embodiments, these embodiments are provided merely to help with the understanding of the present invention. Thus, the scope of the present invention is not limited to the following embodiments.

Reference Example 1

Synthesis of Polystyrene Spherical Particles

A styrene monomer, 3-allyloxy-2-hydroxy-1-propanesulfonic acid, as an anionic monomer, and potassium persulfate as an anionic initiatorwere used. Sodium dodecylsulfate as an emulsifier, and divinylbenzene as an X-linker were used. Specifically, 30 int of distilled water, 6-13 in of a styrene monomer, 0-0.6 g of 3-allyloxy-2-hydroxy-1-propanesulfonic acid as an anionic monomer, 0.01-1 g of potassium persulfate as an anionic initiator, 0.011-0.54 g of sodium dodecylsulfate, and 0.51 g of divinylbenzene were used to synthesize polystyrene spherical particles through emulsion polymerization. The more content the initiator and the emulsifier have, the smaller the particle diameter. Also, the less monomers, the smaller the particle diameter. Thus, the polystyrene spherical particles having diameters shown in Table 1 below were synthesized by controlling the particle diameter. The particle sizes and surface potentials of the synthesized polystyrene spherical particles were tabulated in Table 1 below.

TABLE 1

| Particle | Diameter (nm) | Surface charge (mV) |
|---|---|---|
| PS-1 | 90 | −49.62 |
| PS-2 | 150 | −56.77 |
| PS-3 | 170 | −61.10 |

Test Example 1

Verification on Reflective Color of Photonic Crystal Display Device Using Single Dispersion Medium 15 weight percent (wt %) of PS-3 particles (i.e., 170 nm diameter) prepared in Referencee Example 1 above were dispersed in water to form a photonic crystal.

FIG. 1 illustrates a polymeric colloidal photonic crystal display device according to the prior art, using inorganic particles and a single dispersion medium.

Referring to FIG. 1, the photonic crystal described above, which is 60 μm thick, is placed between two Indium Tin Oxide (ITO) electrodes, and then sealed therebetween. The multiple PS-3 particles dispersed in water were electrically stabilized by their repulsive force due to the surface negative potential to form a face-centered cubic photonic crystal structure.

Figure 2:
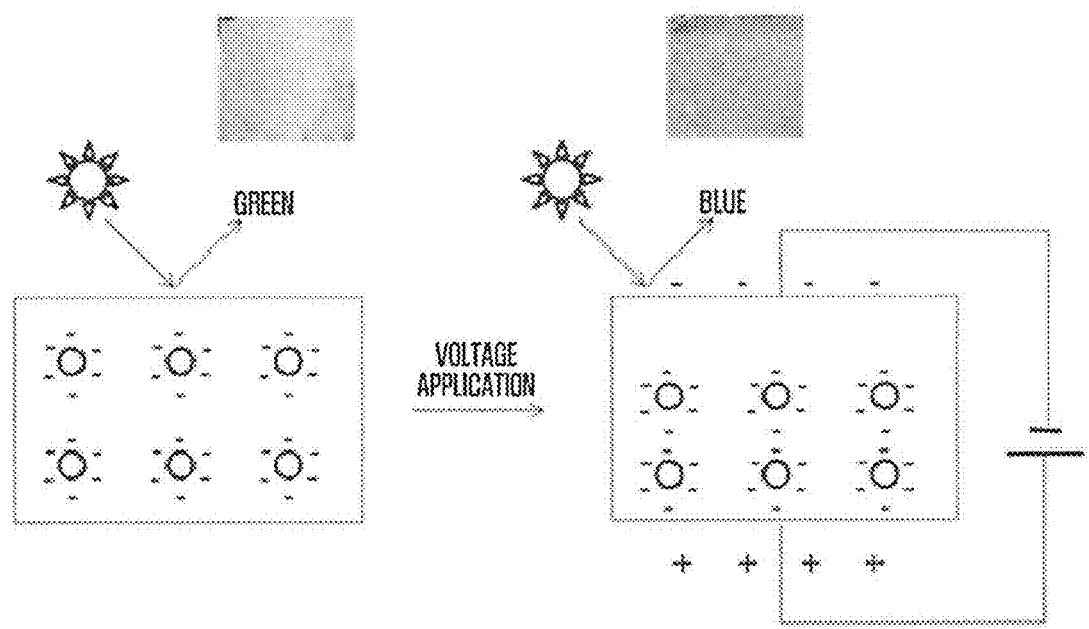
FIG. 2 illustrates reflective colors when solar light is incident to a photonic crystal display device using water as a single dispersion medium according to the prior art, with and without a voltage applied.

FIG. 2 illustrates reflective colors when solar light is incident to a photonic crystal display device using water as a single dispersion medium according to the prior art, with and without a voltage applied.

Referring to FIG. 2, when white light such as solar light is incident to a display device including the photonic crystal structure, only a green light of a particular wavelength is reflected due to Bragg diffraction in the display device. When a direct current (DC) electric field of 2.5 V or higher is applied between the ITO electrodes sealing the photonic crystal, multiple particles exhibiting negative charges move toward a positive (i.e., "+") electrode by electrical attraction, and thus the distance between photonic crystal particles is decreased, causing a shortening of the wavelength of the Bragg reflected light so that the color displayed by the display device is changed to blue.

Figure 3A:
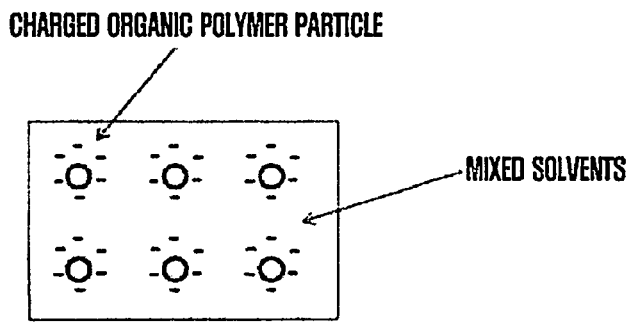
FIG. 3A illustrates a photonic crystal display device using organic polymer particles and mixed solvents according to an embodiment of the present invention.

FIG. 3A illustrates a photonic crystal display device using organic polymer particles and mixed solvents according to an embodiment of the present invention.

Figure 3B:
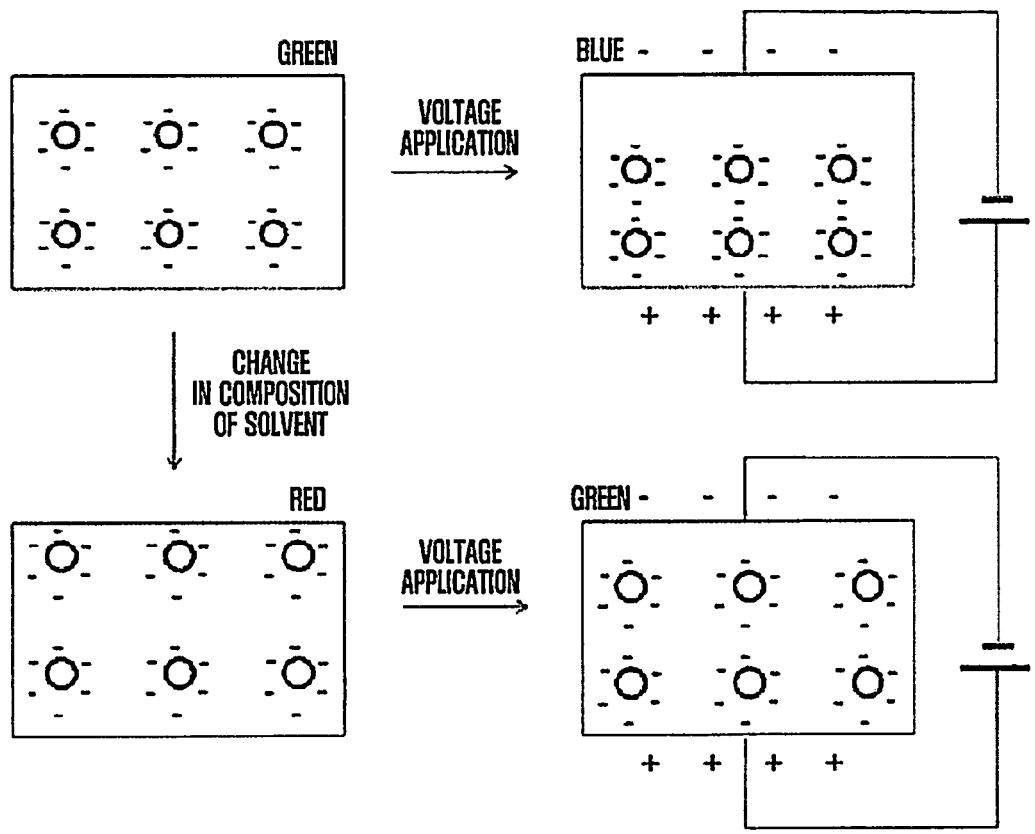
FIG. 3B illustrates photonic crystal display devices according to embodiments of the present invention in which the solvent composition is changed to control the distance between particles and illustrates the induction of reflective colors by applying a voltage between the upper and lower substrates of the respective display devices.

FIG. 3B illustrates photonic crystal display devices according to embodiments of the present invention in which the solvent composition is changed to control the distance between particles and illustrates the induction of reflective colors by applying a voltage between the upper and lower substrates of the respective display devices.

Preparative Example 1

Preparation of Photonic Crystal

A photonic crystal of Comparative Example 1 was prepared by dispersing 15 weight percent (wt %) of the PS-3 particles (i.e., 170 nm diameter) prepared in Reference Example 1 in water. Polymeric colloidal photonic crystals of Example 2 to 7 dispersed in the mixed dispersion media were prepared by dispersing 15 wt % of the PS-3 particles in water and then adding glycerol thereto according to compositions shown in Table 2 below.

TABLE 2

| | Mixed dispsersion medium (wt % based on the total wt % of mixed dispersion medium) | | Content of photonic crystal particles based on the total | Refractive |
|---|---|---|---|---|
| | Water content | Glycerol content | weight of photonic crystal (wt %) | index |
| Comparative Example 1 | 100 | 0 | 15 | 1.333 |
| Example 1 | 90 | 10 | 13.5 | 1.346 |
| Example 2 | 80 | 20 | 12 | 1.357 |
| Example 3 | 70 | 30 | 10.5 | 1.371 |
| Example 4 | 60 | 40 | 9 | 1.384 |
| Example 5 | 50 | 50 | 7.5 | 1.397 |
| Example 6 | 40 | 60 | 6 | 1.407 |
| Example 7 | 30 | 70 | 4.5 | 1.428 |

Test Example 2

Figure 4:
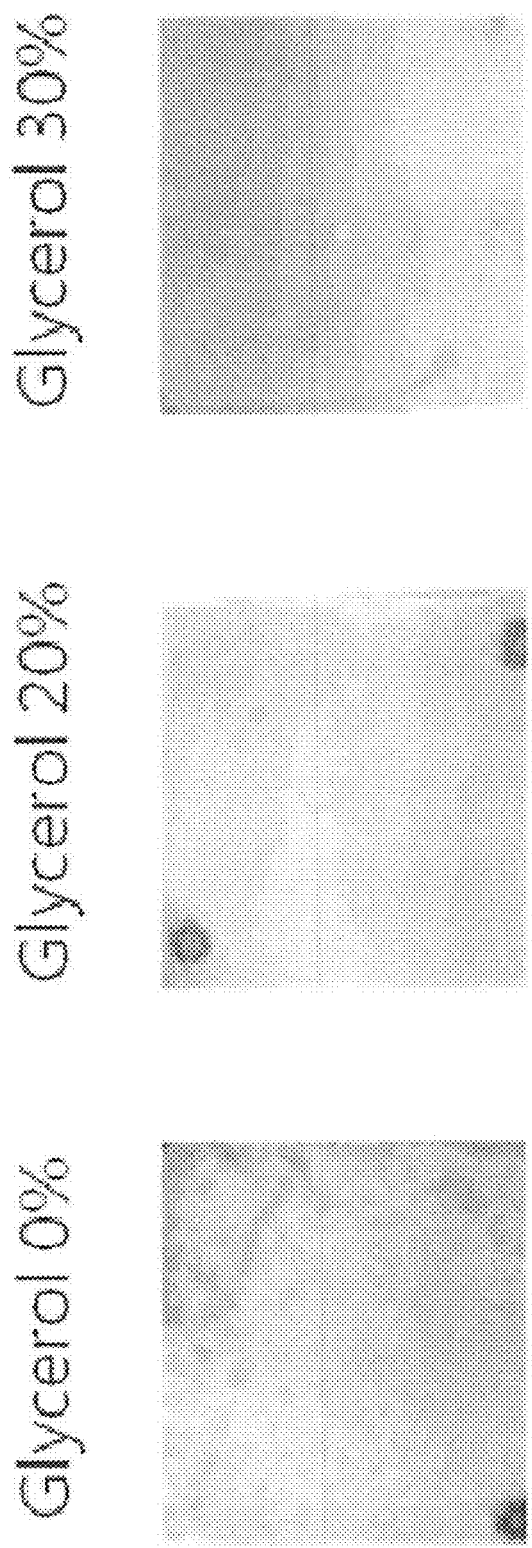
FIG. 4 shows photographs illustrating color changes for respective concentrations of glycerol while a voltage is not applied to display devices according to embodiments of the present invention.

Observation on Reflected Light According to the Concentration of Mixed Dispersion Medium FIG. 4 shows photographs illustrating color changes according to embodiments of the present invention.

Referring to FIG. 4, the photographs illustrate color changes for respective concentrations of glycerol (i.e., 0 wt %, 20 wt %, and 30 wt %, according to Table 2) while a voltage was not applied to the display devices manufactured by dispersing PS-3 particles in a mixed dispersion medium.

Each of the photonic crystals of 0 wt % glycerol (i.e., 100% water), 20 wt % glycerol, and 30 wt % glycerol listed in Table 2 having a thickness of 60 μm was sealed between two substrates (e.g., sheets) of ITO. The color change depending on the glycerol content at room temperature was observed using a digital camera, and the results are tabulated in Table 4.

The results of FIG. 4 show that the color of the reflected light was green, orange, and red when the glycerol content was 0 wt %, 20 wt %, and 30 wt %, respectively. In other words, without the application of a voltage, the wavelength of the reflected light becomes longer as the glycerol content increased. Therefore, it can be seen that the initial wavelength of the reflected light can be controlled by adjusting the glycerol content.

Test Example 3

Figure 5:
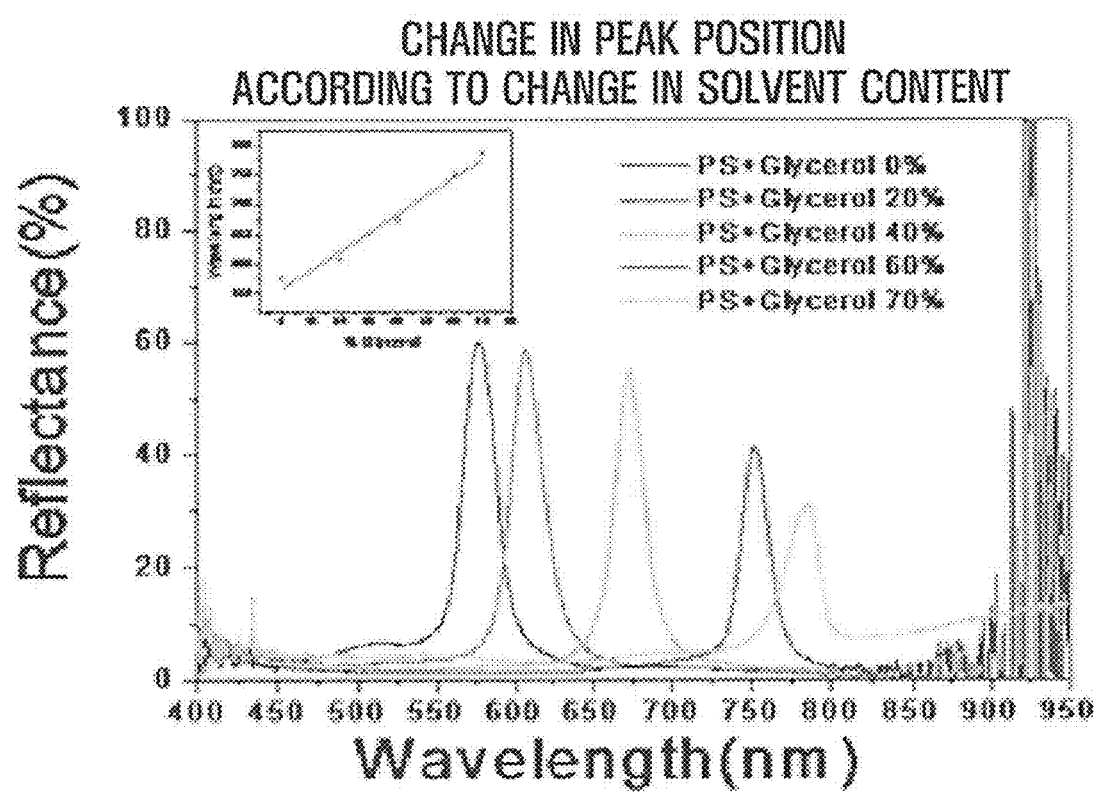
FIG. 5 is a graph showing a reflectance spectrum change according to embodiments of the present invention.

Observation on Reflective Color Spectrum According to the Concentration of Mixed Dispersion Medium FIG. 5 is a graph of reflectance spectrum change according to embodiments of the present invention.

Referring to FIG. 5, the graph shows the reflectance spectrum change, which was obtained by measuring reflectance for respective concentrations of glycerol (i.e., 0 wt %, 20 wt %, 40 wt %, 60 wt %, and 70 wt % as listed in Table 2) while a voltage is not applied to the display device according to embodiments of the present invention.

In order to more precisely compare the change in reflective color according to the concentration of the mixed dispersion medium, each photonic crystal of 0 wt % glycerol, 20 wt % glycerol, 40 wt % glycerol, 60 wt % glycerol, and 70 wt % glycerol, as listed in Table 2, having a thickness of 60 μm was sealed between two ITO substrates. Reflectance measurements were conducted using an ultraviolet-visible (UV-Vis) spectrometer to observe the reflectance spectrum change, and the results are tabulated in FIG. 5.

It can be seen from the results of FIG. 5 that the peak of the spectrum gradually shifted toward long wavelengths as the glycerol content increased. According to the above results, when considering only the change in refractive index due to the increase in the glycerol content in the water-glycerol mixed dispersion medium, the reflective peak for the mixed dispersion medium of water:glycerol=30:70 has a wavelength change of +7% as compared with the reflective peak for the dispersion medium using only pure water, by the Bragg equation. Therefore, the peak of the reflective color spectrum is expected to be 615 nm for the mixed dispersion medium of water:glycerol=30:70. However, FIG. 5 indicates a wavelength change of about 36% actually occurred and thus the peak of the reflective color spectrum was 770 nm. Therefore, the change in the peak of the reflective color spectrum is not only due to the change in the refractive index caused by increasing the glycerol content, but also due to the increase in the distance between photonic crystal particles, resulting from the reduction in dispersive force between the photonic crystal particles caused by increasing the dielectric constant of the dispersion medium as well as the increase in the distance between photonic crystal particles, resulting from the increase in the glycerol content and thus the reduction in the photonic crystal particle weight percent. Therefore, the change in the peak of the reflective color spectrum cannot be determined solely from the change in the refractive index.

Test Example 4

Observation on Change in Reflected Light According to Application of Voltage 15 wt % of the PS-3 particles (i.e., 170 nm diameter) synthesized in Reference Example 1 were dispersed in water, and then glycerol was added thereto in concentrations of 25 wt %, 30 wt %, and 35 wt % based on the total weight of the mixed dispersion medium, thereby resulting in polymeric colloidal photonic crystals dispersed in the mixed dispersion media according to compositions shown in Table 3 below.

TABLE 3

| Mixed dispsersion meidum (wt % based on the total wt % of mixed dispersion medium) | | Content of photonic crystal particles based on the total weight of photonic crystal (wt %) |
|---|---|---|
| Water content | Glycerol content | |
| Example 8 | 75 | 25 | 11.25 |
| Example 9 | 70 | 30 | 10.5 |
| Example 10 | 65 | 35 | 9.75 |

The polymeric colloidal photonic crystals each having a thickness of 25 μm were sealed between two ITO electrodes to form display devices, respectively. Voltages of 0 V, 3.1 V, and 3.5 V are applied to each of the display devices to generate color changes of reflected light, where reflectance were measured using a UV-Vis spectrometer.

Figure 6:
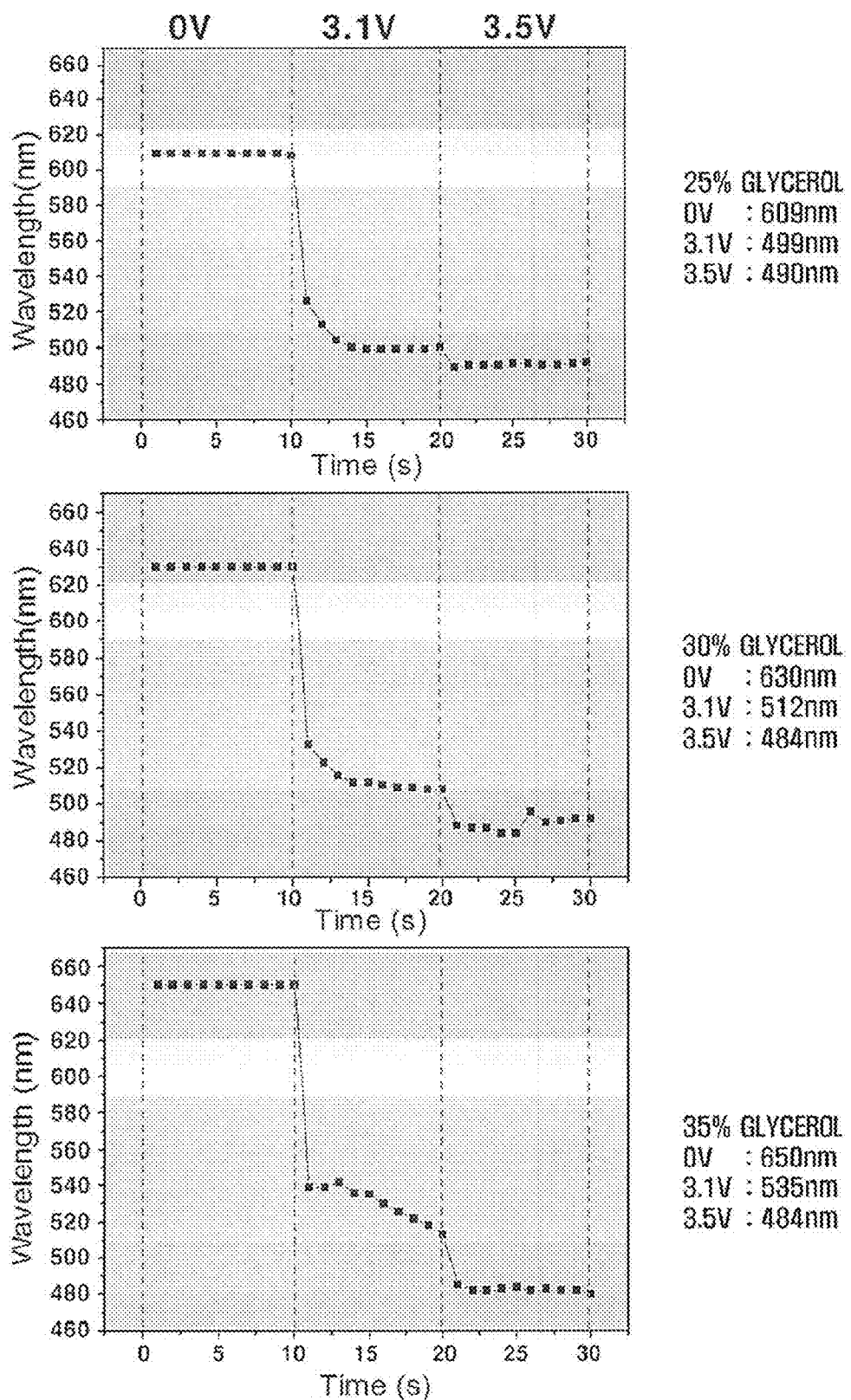
FIG. 6 is a series of graphs illustrating the wavelengths of peaks of spectrums over time according to embodiments of the present invention.

FIG. 6 is a series of graphs illustrating wavelength peaks of spectrums over time according embodiments of the present invention.

Referring to FIG. 6, the wavelength of the peak of the spectrum over time was obtained by measuring reflectance using a UV-Vis spectrometer while voltages of 0 V, 3.1 V, and 3.5 V are applied to each of the display devices using photonic crystals prepared by dispersing PS-3 particles in water-glycerol mixed dispersion media containing glycerol concentrations of 25 wt %, 30 wt %, and 35 wt %.

It can be seen from FIG. 6 that the peak range of the reflected light was changed according to the glycerol content of the mixed dispersion medium when the same-level voltage was applied.

In addition, while voltages of 0 V-3.9 V at an interval of 0.1 V were applied to the display devices manufactured by sealing 25 μm-thick polymeric colloidal photonic crystals prepared according to the compositions 30 wt % glycerol and 35 wt % glycerol listed in Table 3 between ITO electrodes, the color changes of the reflected light were photographed by a digital camera, and the photographed color changes were measured using a colorimeter and plotted on the Commission Internationale de l'Eclairage (CIE) chromaticity diagram.

Figure 7:
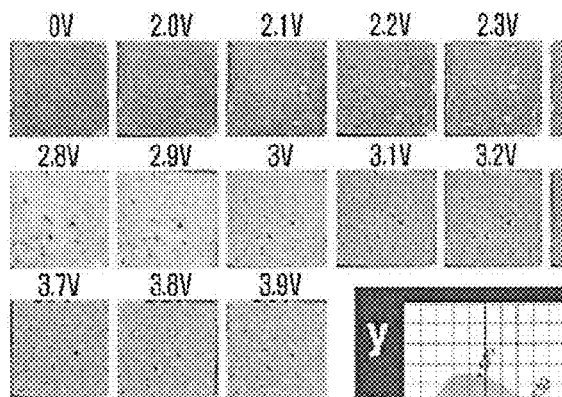
FIG. 7 illustrates color changes of reflected light according to an embodiment of the present invention.
Figure 7:
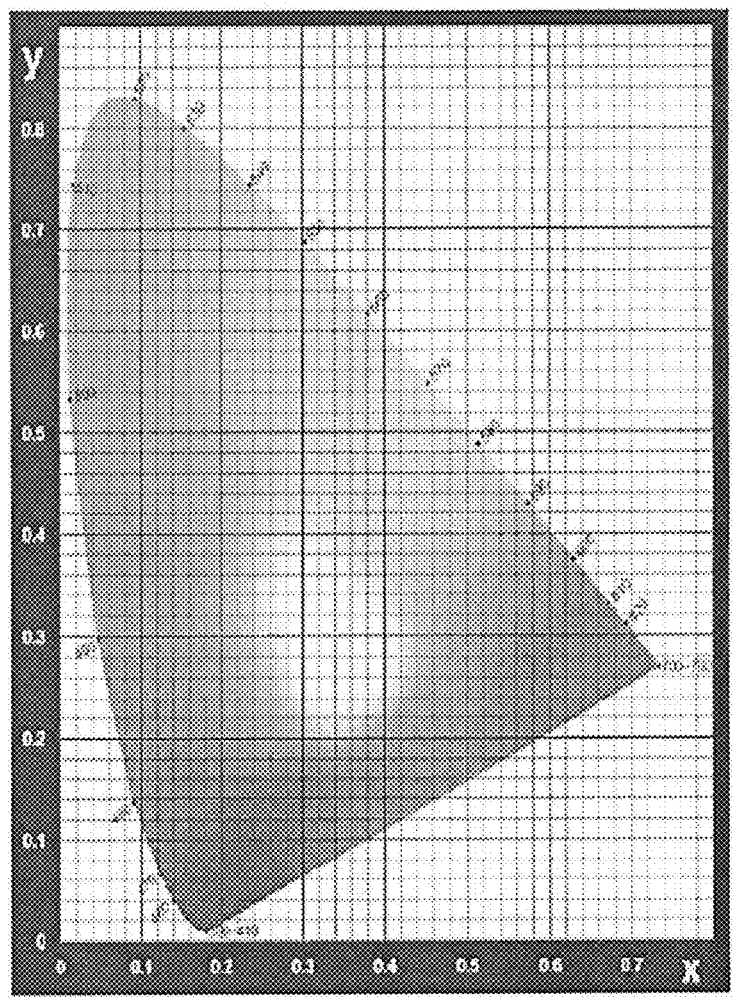

FIG. 7 illustrates color changes of reflected light according to an embodiment of the present invention.

Referring to FIG. 7, the color changes of the reflected light, which were obtained while voltages of 0-3.9 V are applied at an interval of 0.1V to a display device using a photonic crystal prepared by dispersing PS-3 particles in a water-glycerol mixed dispersion medium having a glycerol concentration of 30 wt %, were measured by a digital camera and then plotted on the CIE chromaticity diagram.

Figure 8:
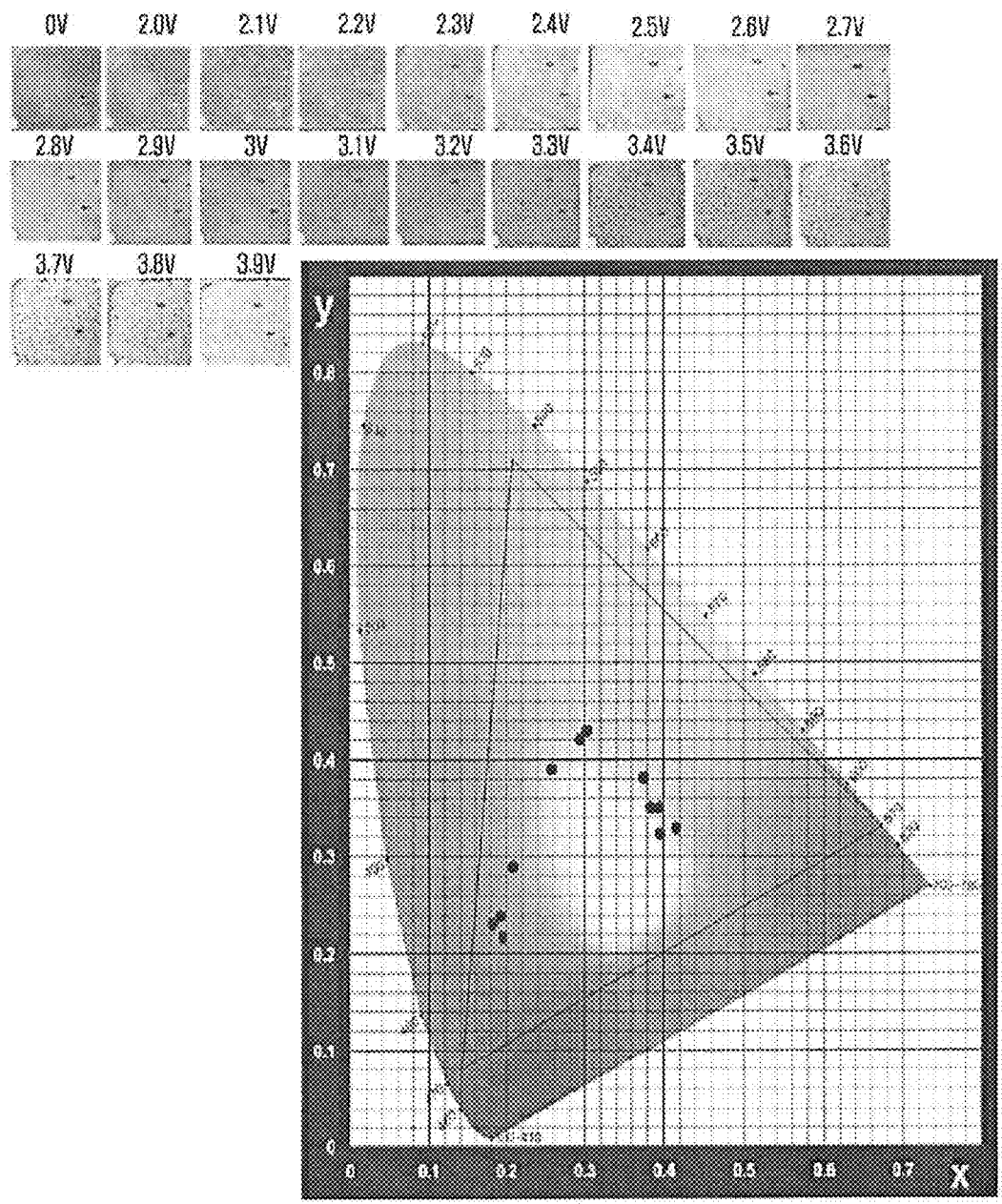
FIG. 8 illustrates color changes of reflected light according to an embodiment of the present invention.

FIG. 8 illustrates color changes of reflected light according to an embodiment of the present invention.

Referring to FIG. 8, the color changes of the reflected light, which were obtained while voltages of 0-3.9 V were applied at an interval of 0.1V to a display device using a photonic crystal prepared by dispersing PS-3 particles in a water-glycerol mixed dispersion medium having a glycerol concentration of 35 wt %, were measured by a digital camera and then plotted on the CIE chromaticity diagram. It can be seen from FIGS. 7 and 8 that the spectrum change of the reflected light is changed by controlling a reflective color of a photonic crystal display device according to the present invention, where the glycerol content of the mixed dispersion medium was adjusted, resulting in a display of full and clear colors. More specifically, a photonic crystal containing 30 wt % of glycerol shows a color gamut of 9.7% and Example 10 containing 35 wt % of glycerol shows a color gamut of 13.6%, as compared with the National Television System Committee (NTSC) standard color gamut shown on the CIE color coordinates. Therefore, it can be seen that the color range (i.e., the wavelength range) increases as the glycerol content in the mixed dispersion medium increases. Furthermore, as described above, the change in the color range is determined to be a complex result obtained not only due to the change in the refractive index caused by increasing the glycerol content but also due to the increase in the distance between photonic crystal particles, resulting from the reduction in dispersive force between the photonic crystal particles caused by increasing the dielectric constant of the dispersion medium as well as due to the increase in the distance between photonic crystal particles, resulting from the increase in the glycerol content and thus the reduction in the photonic crystal particle weight percent.

As described above, those skilled in the art to which the present invention pertains will understand that the present invention may be implemented in various detailed forms without changing the technical spirit or indispensable characteristics of the present invention. It will be understood that the aforementioned embodiments are illustrative and not limitative from all aspects. The scope of the present invention is defined by the appended claims rather than the detailed description, and the present invention should be construed as covering all modifications or variations derived from the meaning and scope of the appended claims and their equivalents.

What is claimed is:

1. A method of controlling a reflective color of a photonic crystal comprising:
    dispersing photonic crystal particles having surface charges in a mixed dispersion medium containing at least two solvents having different dielectric constants; and
    selecting user-definable concentrations of the at least two solvents in the mixed dispersion medium,
    wherein the at least two solvents are water and at least one of glycerol and ethylene glycol, and
    wherein the photonic crystal particles are in the range of 3-15 weight percent (wt %) of a total weight of the photonic crystal.

2. The method of claim 1, wherein the mixed dispersion medium contains water and glycerol.

3. The method of claim 1, wherein the photonic crystal particle is selected from the group of particles consisting of polystyrene and polymethyl methacrylate.

4. A photonic crystal comprising photonic crystal particles having surface charges dispersed in a mixed dispersion medium containing at least two solvents having different dielectric constants, wherein each of the at least two solvents is a user-definable concentration of the mixed dispersion medium,
    wherein the at least two solvents are water and at least one of glycerol and ethylene glycol, and
    wherein the photonic crystal particles are in the range of 3-15 weight percent (wt %) of a total weight of the photonic crystal.

5. The photonic crystal of claim 4, wherein the mixed dispersion medium contains water and glycerol.

6. The photonic crystal of claim 4, wherein the photonic crystal particle is selected from the group of particles consisting of polystyrene and polymethyl methacrylate.

7. The method of claim 1, the method further comprising:
    sealing the photonic crystal in a container having two or more light transmissive electrodes; and
    applying an electric field between the light transmissive electrodes to control the distance between the photonic crystal particles.

8. A photonic crystal display device comprising photonic crystal particles having surface charges dispersed in a mixed dispersion medium containing at least two solvents having different dielectric constants, wherein each of the at least two solvents is a user-definable concentration of the mixed dispersion medium, and wherein the photonic crystal is sealed in a container having two or more light transmissive electrodes,
    wherein the at least two solvents are water and at least one of glycerol and ethylene glycol, and
    wherein the photonic crystal particles are in the range of 3-15 weight percent (wt %) of a total weight of the photonic crystal.

* * * * *